US009982717B2

(12) United States Patent
Kazama

(10) Patent No.: US 9,982,717 B2
(45) Date of Patent: May 29, 2018

(54) BEARING STRUCTURE

(71) Applicant: NTN CORPORATION, Osaka (JP)

(72) Inventor: Sadatsune Kazama, Kuwana (JP)

(73) Assignee: NTN CORPORATION, Osaka (JP)

( * ) Notice: Subject to any disclaimer, the term of this patent is extended or adjusted under 35 U.S.C. 154(b) by 108 days.

(21) Appl. No.: 15/069,322

(22) Filed: Mar. 14, 2016

(65) Prior Publication Data

US 2016/0195136 A1 Jul. 7, 2016

Related U.S. Application Data

(63) Continuation of application No. PCT/JP2014/073863, filed on Sep. 10, 2014.

(30) Foreign Application Priority Data

Sep. 18, 2013 (JP) ................................ 2013-192832

(51) Int. Cl.

*F16C 19/24* (2006.01)
*F16C 33/66* (2006.01)
(Continued)

(52) U.S. Cl.

CPC .......... *F16C 33/6681* (2013.01); *F16C 17/04* (2013.01); *F16C 19/26* (2013.01); (Continued)

(58) Field of Classification Search

CPC ........ F16C 19/26; F16C 19/28; F16C 19/463; F16C 19/466; F16C 19/48; F16C 33/581; (Continued)

(56) References Cited

U.S. PATENT DOCUMENTS 4,776,237 A 10/1988 Premiski et al.
5,356,352 A 10/1994 Sakamoto et al.
(Continued)

FOREIGN PATENT DOCUMENTS

CN 101821518 A 9/2010
CN 103089825 A 5/2013
(Continued)

OTHER PUBLICATIONS

International Preliminary Report on Patentability dated Mar. 31, 2016 in corresponding International Patent Application No. PCT/JP2014/073863.

(Continued)

*Primary Examiner* — Phillip A Johnson

(57) ABSTRACT

An outer-ring-equivalent component having an annular raceway surface on which rolling elements roll is disposed on an outer circumference of a bearing. The bearing is, for example, a retainer-equipped roller. Between the bearing and a fixed member located apart from the bearing in an axial direction, a thrust washer is interposed so as to be movable in the axial direction. A gap forming device is provided which constantly forms a gap between the thrust washer and the outer-ring-equivalent component. For example, as the gap forming device, an axial width of the bearing is made larger than an axial width of the outer-ring-equivalent component.

3 Claims, 6 Drawing Sheets

(51) Int. Cl.

| | |
|---|---|
| ***F16C 19/26*** | (2006.01) |
| ***F16C 17/04*** | (2006.01) |
| ***F16C 21/00*** | (2006.01) |
| ***F16C 23/02*** | (2006.01) |
| ***F16C 25/08*** | (2006.01) |
| ***F16C 33/58*** | (2006.01) |
| ***F16H 57/04*** | (2010.01) |
| *F16C 17/08* | (2006.01) |
| *F16C 19/28* | (2006.01) |
| *F16C 23/04* | (2006.01) |
| *F16H 57/08* | (2006.01) |

(52) U.S. Cl.
CPC .............. *F16C 21/00* (2013.01); *F16C 23/02* (2013.01); *F16C 25/083* (2013.01); *F16C 33/581* (2013.01); *F16C 33/586* (2013.01); *F16C 33/6659* (2013.01); *F16H 57/0482* (2013.01); *F16C 17/08* (2013.01); *F16C 19/28* (2013.01); *F16C 23/041* (2013.01); *F16C 2361/61* (2013.01); *F16H 2057/085* (2013.01)

(58) Field of Classification Search
CPC ................ F16C 33/586; F16C 33/6681; F16C 2361/61; F16H 2057/085
See application file for complete search history.

(56) References Cited

U.S. PATENT DOCUMENTS

| | | | | |
|---|---|---|---|---|
| 5,593,362 | A | 1/1997 | Mizuta | |
| 5,649,879 | A | 7/1997 | Kusumoto et al. | |
| 8,246,254 | B2 | 8/2012 | Kikukawa et al. | |
| 2010/0129023 | A1* | 5/2010 | Lemaitre ................. | F01L 1/047 384/620 |
| 2011/0176760 | A1 | 7/2011 | Kikukawa et al. | |
| 2013/0094792 | A1 | 4/2013 | Schwartz et al. | |

FOREIGN PATENT DOCUMENTS

| | | | | |
|---|---|---|---|---|
| DE | 199 02 565 A1 | 7/2000 | | |
| DE | 10334880 A1 * | 3/2005 | .............. | F16C 21/00 |
| JP | 1-120425 | 5/1989 | | |
| JP | 3-14947 | 1/1991 | | |
| JP | 5-69436 | 9/1993 | | |
| JP | 6-73436 | 10/1994 | | |
| JP | 7-293642 | 11/1995 | | |
| JP | 9-53553 | 2/1997 | | |
| JP | 10-318264 | 12/1998 | | |
| JP | 2000-320558 | 11/2000 | | |
| JP | 2002-81441 | 3/2002 | | |
| JP | 2003-49932 | 2/2003 | | |
| WO | WO 00/43688 | 7/2000 | | |

OTHER PUBLICATIONS

Japanese Office Action dated May 23, 2017 from Japanese Patent Application No. 2013-192832, 4 pages.
Extended European Search Report dated Jan. 30, 2017 in corresponding European Patent Application No. 14845271.7.
International Search Report dated Nov. 11, 2014 in corresponding International Application PCT/JP2014/073863.
Chinese Office Action dated Mar. 16, 2017 in corresponding Chinese Patent Application No. 201480050719.4.
Chinese Office Action dated Nov. 1, 2017 in corresponding Chinese Patent Application No. 201480050719.4.
Notice of Reason(s) for Rejection dated Dec. 26, 2017 in corresponding Japanese Patent Application No. 2013-192832, 4 pages.

* cited by examiner

BEARING STRUCTURE

CROSS REFERENCE TO THE RELATED APPLICATION

This application is a continuation application, under 35 U.S.C. § 111(a), of international application No. PCT/JP2014/073863, filed Sep. 10, 2014, which claims priority to Japanese patent application No. 2013-192832, filed Sep. 18, 2013, the entire disclosure of which is herein incorporated by reference as a part of this application.

BACKGROUND OF THE INVENTION

Field of the Invention

The present invention relates to a bearing structure used in a planetary reduction gear or the like provided on a traveling unit, a swing unit, or the like of a construction machine, for example.

Description of Related Art

In a planetary gear supporting portion of a planetary reduction gear, as shown in FIGS. 8A and 8B, for example, an outer-ring-equivalent component 2 which is a planetary gear is rotatably supported via a bearing 3 by a shaft 1 provided on a fixed member 7 which is a carrier. As the bearing 3, for example, a retained roller assembly composed of a rolling element 5 such as a cylindrical roller and a retainer 6 is used. In order to receive a thrust load, a thrust washer 4 movable in the axial direction is often provided between the bearing 3 and the fixed member 7 as shown in the figures.

In this type of planetary gear supporting portion, there are cases where an oil hole for lubrication (not shown) is provided in a non-loaded area of a rolling element raceway surface 1*a* of the shaft 1, and oil is injected from the oil hole to the inside of the bearing 3 to forcibly lubricate the bearing 3. In this case, for example, in a bearing structure described in Patent Document 1, the space inside a pocket of the retainer is increased by, for example, reducing the size of claws that prevent the roller from dropping from the pocket, the claws being projecting from a radially inner end and a radially outer end of a surface that faces the pocket and is along the axial direction toward the inside of the pocket. Thus, running of the oil is enhanced to improve the lubricity. Further, as described in Patent Document 1 and Patent Document 2, an inner diameter surface of the retainer is tapered such that the inner diameter thereof increases outward in the axial direction, thereby to allow the oil to easily enter a gap between the shaft and the retainer. Thus, the lubricity at the inner diameter side of the retainer is improved.

RELATED DOCUMENT

Patent Document

[Patent Document 1] JP Laid-open Patent Publication No. 2000-320558

[Patent Document 2] JP Laid-open Patent Publication No. H10-318264

Forcibly lubricating the bearing through the oil hole provided in the shaft as described above has the following problem. That is, the oil containing foreign matter such as wear debris, supplied through the oil hole, enters the inside and in the vicinity of the bearing, and the foreign matter is jammed between the rolling element and the shaft and between the rolling element and the outer-ring-equivalent component, whereby surface portions of the rolling element, the shaft, and the outer-ring-equivalent component are peeled off. Therefore, the structure shown in FIGS. 8A and 8B is sometimes preferable, in which no oil hole is provided in the shaft 1 and the bearing 3 is not forcibly lubricated.

However, in the lubrication method in which the bearing is not forcibly lubricated, the thrust washer 4 may come into close contact with an end face of the outer-ring-equivalent component 2 due to surface tension of the oil, and the bearing 3 may be hermetically sealed as shown in FIG. 8B. Then, the oil is not circulated between the inside/vicinity of the bearing 3 and the outside, and the foreign matter is likely to stay in and around the bearing 3. As a result, the phenomenon also occurs, in which the foreign matter is jammed between the rolling element 5 and the shaft 1 and between the rolling element 5 and the outer-ring-equivalent component 2.

Even when the oil hole is formed in the shaft 1, if the oil is not forcibly supplied through the oil hole, the bearing 3 may be hermetically sealed as described above.

SUMMARY OF THE INVENTION

An object of the present invention is to provide a bearing structure which does not forcibly lubricate a bearing, and makes foreign matter such as wear debris contained in the oil for lubrication, not likely to stay in and around the bearing, thereby avoiding the situation that the foreign matter is jammed between the rolling element and the shaft and between the rolling element and the outer-ring-equivalent component, and thereby the surface portions of the rolling element, the shaft, and the outer-ring-equivalent component are peeled off.

A roller bearing structure according to the present invention includes: a single-row or multiple-row bearing composed of a plurality of rolling elements arranged in a circumferential direction, and an annular retainer that retains the plurality of rolling elements; an outer-ring-equivalent component that is disposed on an outer circumference of the bearing, and has an annular raceway surface on which the rolling elements roll; and a thrust washer that is interposed between the bearing and a fixed member located to be spaced apart from the bearing in an axial direction, and is movable in the axial direction. The bearing structure includes gap forming device that constantly forms a gap between the thrust washer and the outer-ring-equivalent component.

According to this configuration, since the gap forming device constantly forms a gap between the thrust washer and the outer-ring-equivalent component, foreign matter such as wear debris contained in oil for lubrication is not likely to stay in and around the bearing. Thus, it is possible to avoid the situation that the foreign matter is jammed between the rolling element and the shaft and between the rolling element and the outer-ring-equivalent component, and thereby the surface portions of the rolling element, the shaft, and the outer-ring-equivalent component are peeled off.

In the present invention, it is preferable that, as the gap forming device, an axial width of the bearing is set to be larger than an axial width of the outer-ring-equivalent component. That is, in this case, the gap forming device is the bearing having the axial width larger than the axial width of the outer-ring-equivalent component.

In the case where the axial width of the bearing is larger than the axial width of the outer-ring-equivalent component, when, for example, thrust washers are disposed at both sides of the outer-ring-equivalent component, even if one thrust washer comes into close contact with one of end faces of the outer-ring-equivalent component, the other thrust washer is not likely to come into close contact with the other end face of the outer-ring-equivalent component because the bearing hinders the contact. Therefore, it is possible to realize a state where a gap is constantly formed between at least one of the thrust washers and the outer-ring-equivalent component.

In the present invention, the bearing may be a retainer-equipped roller. That is, the rolling element is not limited to a ball but may be a roller.

Since the thrust washer is provided, the bearing can receive a thrust load even when the bearing is a retainer-equipped roller. In addition, when the rolling element is a roller, the effect of preventing stay of the foreign matter, which is obtained by the gap forming device of the present invention, can be achieved more effectively.

The roller may be a cylindrical roller, a needle roller, or a long cylindrical roller.

As the gap forming device, a projecting portion that projects toward the bearing may be provided on a radial portion of the thrust washer opposed to the bearing. In this case, a dimension value obtained by adding a projecting amount of the projecting portion of the thrust washer to the axial width of the bearing is set to be larger than the dimension value of the axial width of the outer-ring-equivalent component.

According to this configuration, even if the axial width of the bearing is smaller than the axial width of the outer-ring-equivalent component, the same effect as that obtained when the axial width of the bearing is larger than the axial width of the outer-ring-equivalent component can be achieved by providing the thrust washer with the projecting portion, and thus a gap is constantly formed between the thrust washer and the outer-ring-equivalent component.

Further, as the gap forming device, a spacer may be interposed between the bearing and the thrust washer. In this case, a dimension value obtained by adding the axial width of the bearing and the axial width of the spacer is set to be larger than the dimension value of the axial width of the outer-ring-equivalent component.

According to this configuration, even if the axial width of the bearing is smaller than the axial width of the outer-ring-equivalent component, the same effect as that obtained when the axial width of the bearing is larger than the axial width of the outer-ring-equivalent component can be achieved by interposing the spacer between the bearing and the thrust washer, and thus a gap is constantly formed between the thrust washer and the outer-ring-equivalent component.

Further, as the gap forming device, the thrust washer may be formed to have a cross-sectional shape in which an axial distance from the outer-ring-equivalent component is increased toward an outer diameter side thereof. That is, in this case, the gap forming device is the thrust washer having the cross-sectional shape in which the axial distance from the outer-ring-equivalent component is increased toward the outer diameter side thereof.

According to this configuration, even if the axial width of the bearing is smaller than the axial width of the outer-ring-equivalent component, the thrust washer is prevented from coming into close contact with the outer-ring-equivalent component by forming the thrust washer so as to have the above-mentioned cross-sectional shape, and thus a gap is constantly formed between the thrust washer and the outer-ring-equivalent component.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Embodiments of the present invention will be described with reference to the drawings.

Figure 1A:
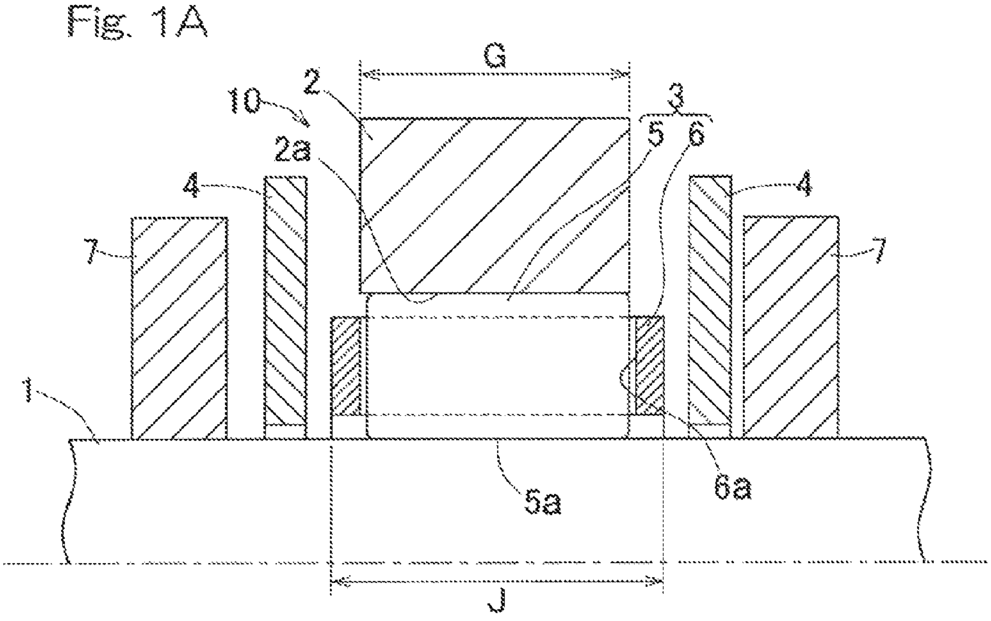
FIG. 1A is a cross-sectional view conceptually showing a state of a bearing structure according to a first embodiment of the present invention.
Figure 1B:
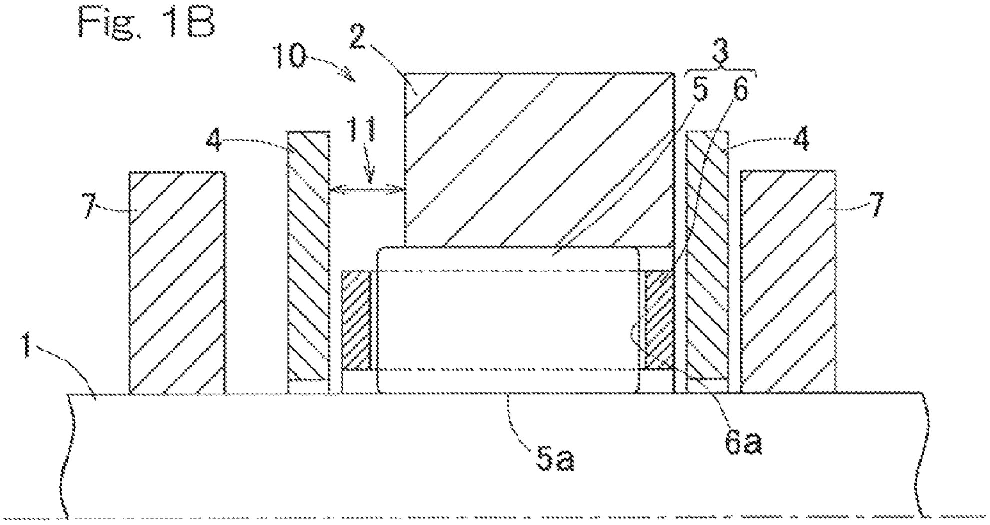
FIG. 1B is a cross-sectional view conceptually showing the bearing structure, in a state different from the state shown in FIG. 1A, according to the first embodiment of the present invention.

FIGS. 1A and 1B show a first embodiment of the present invention. A bearing structure according to the first embodiment is used for rotatably supporting an outer-ring-equivalent component 2 composed of a planetary gear with respect to a horizontally oriented shaft 1, in a planetary reduction gear of a hydraulically operated shovel, for example. The bearing structure is composed of a bearing 3, and thrust washers 4 disposed at both axial sides of the bearing 3.

Figure 3A:
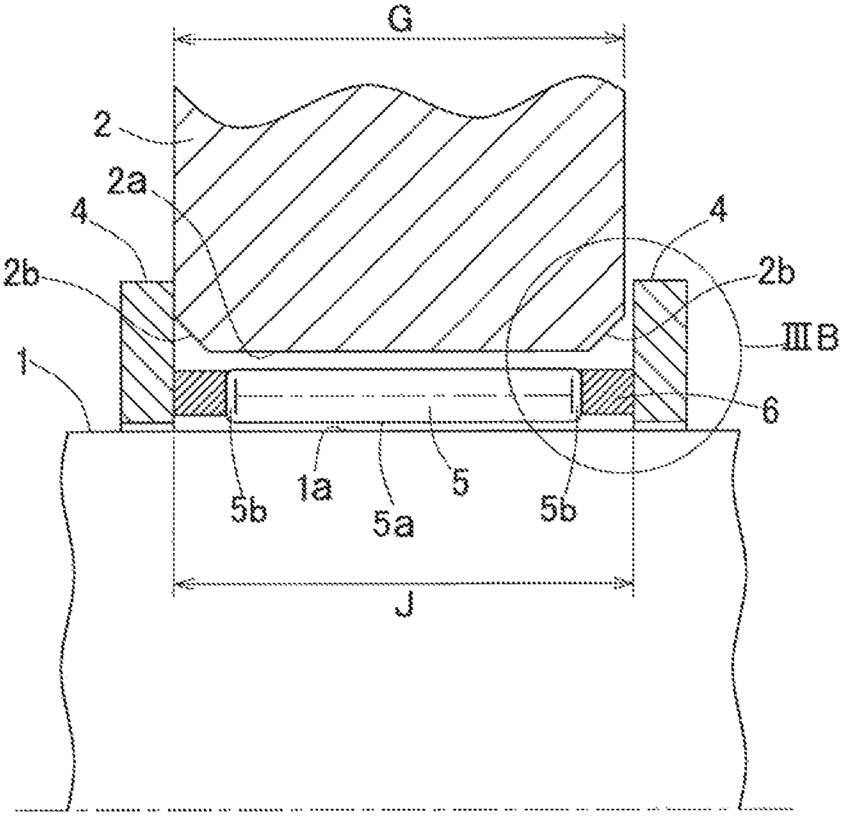
FIG. 3A is a cross-sectional view of a bearing structure in which a retainer is guided-at-outer-diameter-surface.
Figure 3B:
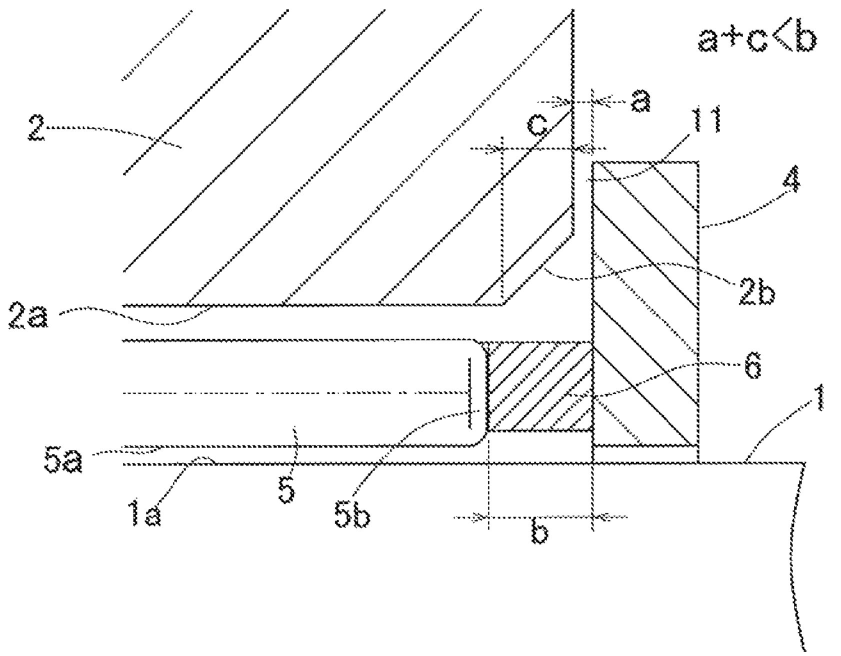
FIG. 3B is a partially enlarged view of FIG. 3A.

The bearing 3 is composed of a plurality of rolling elements 5 arranged in a circumferential direction thereof, and an annular retainer 6 that retains the plurality of rolling elements 5 in a pocket 6*a*. In this example, each rolling element 5 is a cylindrical roller, and the bearing 3 is a retainer-equipped cylindrical roller. Each rolling element 5 has a rolling surface 5*a* on its outer circumference, and rolls on a raceway surface 1*a* formed as an outer peripheral surface of the shaft 1, and a raceway surface 2*a* formed as an inner peripheral surface of the outer-ring-equivalent component 2. In this example, the retainer is guided-by-rolling-element. However, the retainer 6 may be guided-at-inner-diameter-surface (not shown), or may be guided-at-outer-diameter-surface as shown in FIGS. 3A and 3B. The term "guided-by-rolling-element" means that an inner diameter surface of the retainer 6 is not in contact with the shaft 1, an outer diameter surface of the retainer 6 is not in contact with the outer-ring-equivalent component 2, and rotation of the retainer 6 is guided by only the rolling elements 5. The term "guided-at-inner-diameter-surface" means that the inner diameter surface of the retainer 6 is in contact with the shaft 1, whereby rotation of the retainer 6 is guided by the shaft 1. The term "guided-at-outer-diameter-surface" means that the outer diameter surface of the retainer 6 is in contact with the outer-ring-equivalent component 2, whereby rotation of the retainer 6 is guided by the outer-ring-equivalent component 2.

Each thrust washer 4 is a ring-shaped member, both end surfaces of which are smoothly formed. Each thrust washer 4 is movable in the axial direction between the bearing 3 and a fixed member 7. The fixed member 7 is fixed in position, and supports the shaft 1. The fixed member 7 is a carrier of a planetary reduction gear, for example. At a bottom portion of the fixed member 7 composed of the carrier, oil for lubrication is stored to a depth at which the outer-ring-equivalent component 2 or the bearing 3 is immersed in the oil. With rotation of the outer-ring-equivalent component 2 or the bearing 3, the components arranged in the circumferential direction are immersed in the stored oil, whereby the oil for lubrication is supplied to the bearing 3. Therefore, the bearing 3 is not forcibly lubricated. An oil hole for lubrication is not provided in the shaft 1.

The bearing structure is provided with gap forming device 10 that constantly forms a gap between the thrust washer 4 and the outer-ring-equivalent component 2. In the case of the bearing structure shown in FIGS. 1A and 1B, as the gap forming device 10, an axial width J of the bearing 3 is set to be larger than an axial width G of the outer-ring-equivalent component 2.

When the axial widths J and G of the bearing 3 and the outer-ring-equivalent component 2 are set as described above, even if the thrust washer 4 is completely in close contact with or almost comes into close contact with one of end faces of the outer-ring-equivalent component 2 due to surface tension of the oil as shown in FIG. 1B, the thrust washer 4 does not come into close contact with the other end face of the outer-ring-equivalent component 2 because the bearing 3 hinders the contact. Therefore, a gap 11 is constantly formed between at least one of the thrust washers 4 and the outer-ring-equivalent component 2, and foreign matter such as wear debris contained in the oil for lubrication is not likely to stay in the bearing 3, specifically, in the pocket 6*a* of the retainer 6, between the rolling element 5 and the shaft 1, and between the rolling element 5 and the outer-ring-equivalent component 2. Thus, it is possible to avoid the situation that the foreign matter is jammed between the shaft 1 and the rolling element 5 and thereby surface portions of the shaft 1, the outer-ring-equivalent component 2, the rolling element 5 and the like are peeled off.

When the two thrust washers 4 are provided at the both sides of the bearing 3 as described above, it can be said that the gap forming device 10 is a device to form the gap 11 between at least one of the two thrust washers 4 and the outer-ring-equivalent component 2.

FIGS. 1A and 1B are cross-sectional views conceptually showing the bearing structure. However, in an actual bearing structure, as shown in cross-sectional views of FIGS. 2A and 2B and FIGS. 3A and 3B, chamfered portions 2*b* are formed at both ends of the raceway surface 2*a* of the outer-ring-equivalent component 2, and chamfered portions 5*b* are formed at both ends of the rolling surface 5*a* of the rolling element 5 composed of a cylindrical roller. Therefore, in the case where the axial width J of the bearing 3 is set to be larger than the axial width G of the outer-ring-equivalent component 2, in order to make the entire area of the rolling surface 5*a* of the rolling element 5 in the axial direction constantly in contact with the raceway surface 2*a* of the outer-ring-equivalent component 2, the dimensions of the components of the bearing structure need to be set as follows.

Figure 2A:
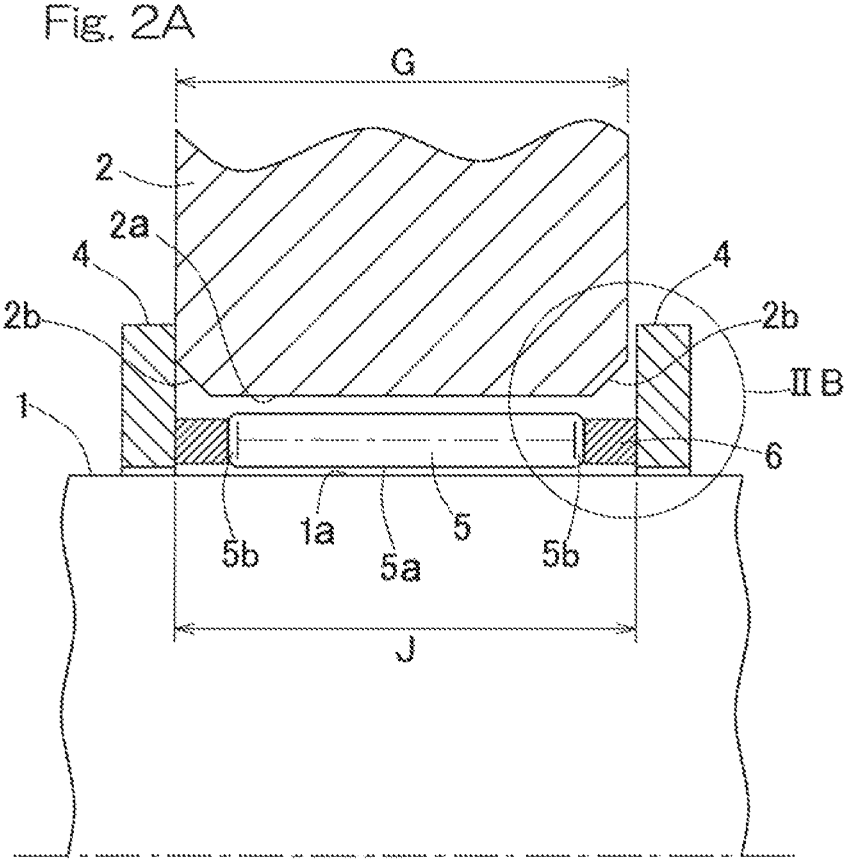
FIG. 2A is a cross-sectional view of a bearing structure in which a retainer is guided-by-rolling-element.
Figure 2B:
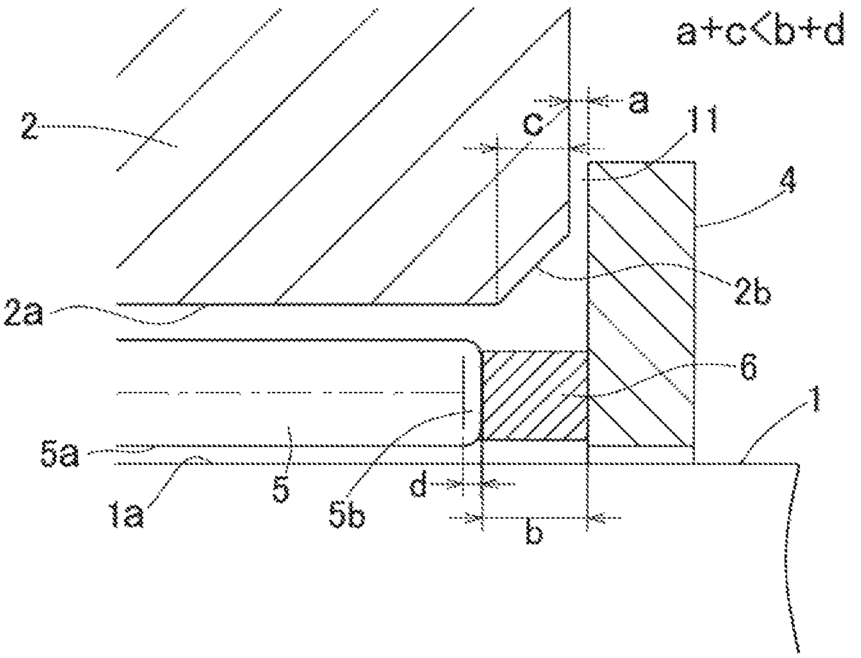
FIG. 2B is a partially enlarged view of FIG. 2A.

That is, in the case of the bearing structure (FIGS. 2A and 2B) in which the retainer 6 is guided-by-rolling-element or guided-at-inner-diameter-surface, a relationship of $a+c<b+d$ is satisfied, in which "a" represents a maximum guide gap, in the axial direction, of the outer-ring-equivalent component 2, "b" represents a minimum guide width from an end surface of the retainer 6 to the pocket 6*a*, "c" represents a maximum chamfering amount of the raceway surface 2*a* of the outer-ring-equivalent component 2, and "d" represents a minimum chamfering amount of the rolling surface 5*a* of the rolling element 5, as shown in FIG. 2B. In the case of the bearing structure (FIGS. 3A and 3B) in which the retainer 6 is guided-at-outer-diameter-surface, a relationship of $a+c<b$ is satisfied as shown in FIG. 3B. The maximum guide gap "a", in the axial direction, of the outer-ring-equivalent component 2 is a maximum guide gap in the axial direction, which is formed between the thrust washer 4 and the outer-ring-equivalent component 2 in the state where the thrust washers 4 at the both ends are in contact with the fixed member 7 (FIGS. 1A and 1B) as a carrier.

In FIGS. 2A and 2B and FIGS. 3A and 3B, a gap is formed between the rolling surface 5*a* of the rolling element 5 and the raceway surface 1*a* of the shaft 1 and between the rolling surface 5*a* of the rolling element 5 and the raceway surface 2*a* of the outer-ring-equivalent component 2. However, actually, the rolling surface 5*a* of the rolling element 5 is in contact with the raceway surface 1*a* of the shaft 1, and the rolling surface 5*a* of the rolling element 5 is in contact with the raceway surface 2*a* of the outer-ring-equivalent component 2.

Figure 4:
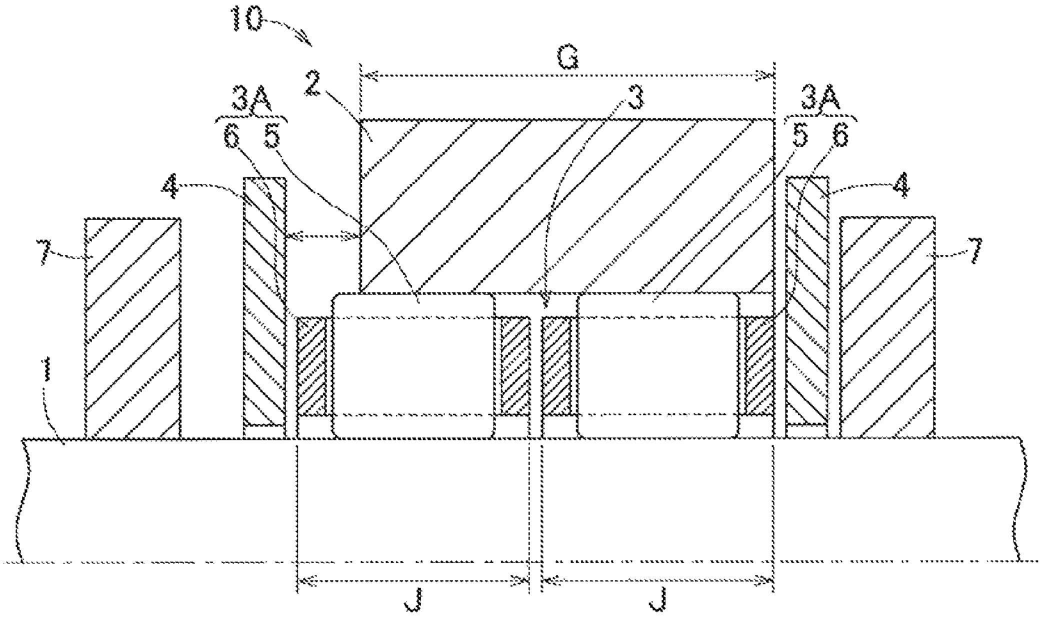
FIG. 4 is a cross-sectional view conceptually showing a bearing structure using multiple rows of bearings.

While the single-row bearing 3 is described as an example in the above embodiment, a multiple-row bearing 3 may be provided as shown in FIG. 4. That is, a plurality of single-row bearing portions 3A may be arranged in the axial direction to provide the multiple-row bearing 3. In this case, the following relationship is satisfied: (axial width J of single-row bearing portion 3A)×(number of single-row bearing portions 3A)>(axial width G of outer-ring-equivalent component 2).

Figure 5:
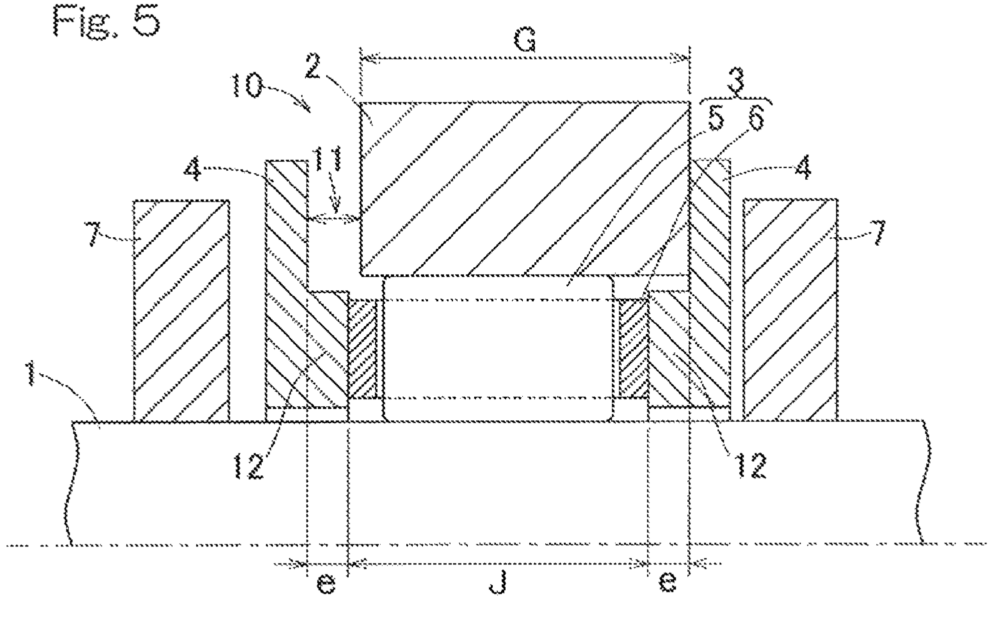
FIG. 5 is a cross-sectional view conceptually showing a roller bearing structure according to a second embodiment of the present invention.

FIG. 5 shows a second embodiment. In a bearing structure according to the second embodiment, a projecting portion 12 that projects toward the bearing 3 is provided, as the gap forming device 10, on a radial portion of each thrust washer 4 opposed to the bearing 3. The projecting portion 12 may be continuously provided over the entire circumference, or projecting portions 12 may be partially provided at a plurality of positions in the circumferential direction. A projecting amount e of the projecting portion 12 is set so that a dimension value (J+2e) obtained by adding a sum of projecting amounts e of the projecting portions 12 of the both thrust washers 4 to the axial width J of the bearing 3 is larger than the dimension value of the axial width G of the outer-ring-equivalent component 2. According to this configuration, even if the axial width J of the bearing 3 is smaller than the axial width G of the outer-ring-equivalent component 2, it is possible to achieve the same effect as that obtained when the axial width J of the bearing 3 is larger than the axial width G of the outer-ring-equivalent component 2 as shown in FIGS. 1A and 1B. Thus, the gap 11 is constantly formed between the thrust washer 4 and the outer-ring-equivalent component 2.

Figure 6:
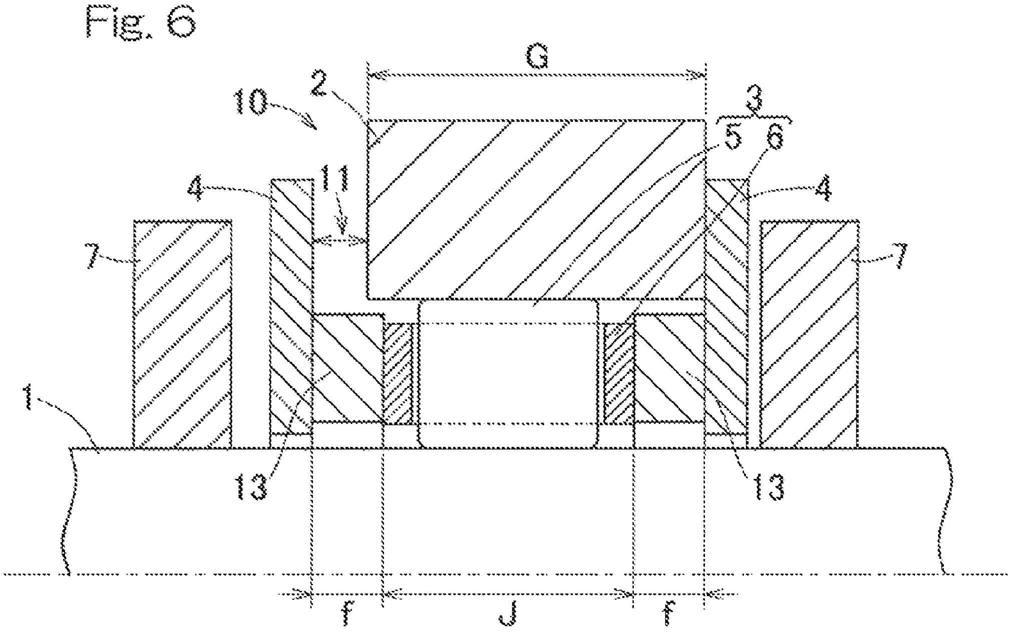
FIG. 6 is a cross-sectional view conceptually showing a roller bearing structure according to a third embodiment of the present invention.

FIG. 6 shows a third embodiment. In a bearing structure according to the third embodiment, an annular spacer 13 is interposed, as the gap forming device 10, between the bearing 3 and each thrust washer 4. An axial width f of the spacer 13 is set so that a dimension value (J+2f) obtained by adding a sum of the axial widths f of the both spacers 13 to the axial width J of the bearing 3 is larger than the dimension value of the axial width G of the outer-ring-equivalent component 2. According to this configuration, even if the axial width J of the bearing 3 is smaller than the axial width G of the outer-ring-equivalent component 2, it is possible to achieve the same effect as that obtained when the axial width J of the bearing 3 is larger than the axial width G of the outer-ring-equivalent component 2 as shown in FIGS. 1A and 1B. Thus, the gap 11 is constantly formed between the thrust washer 4 and the outer-ring-equivalent component 2.

Figure 7:
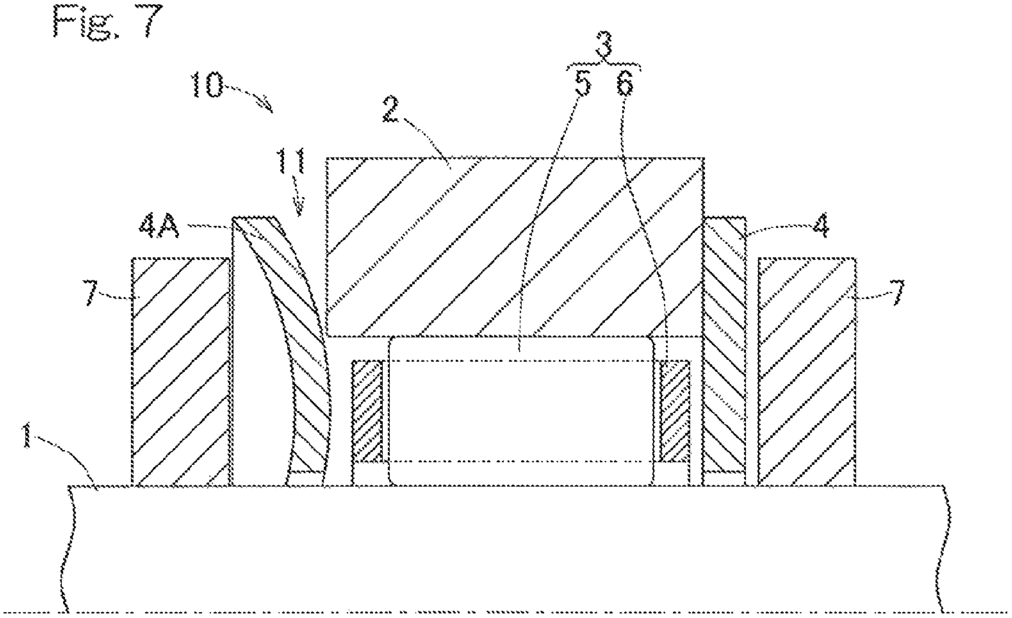
FIG. 7 is a cross-sectional view conceptually showing a roller bearing structure according to a fourth embodiment of the present invention.
Figure 8A:
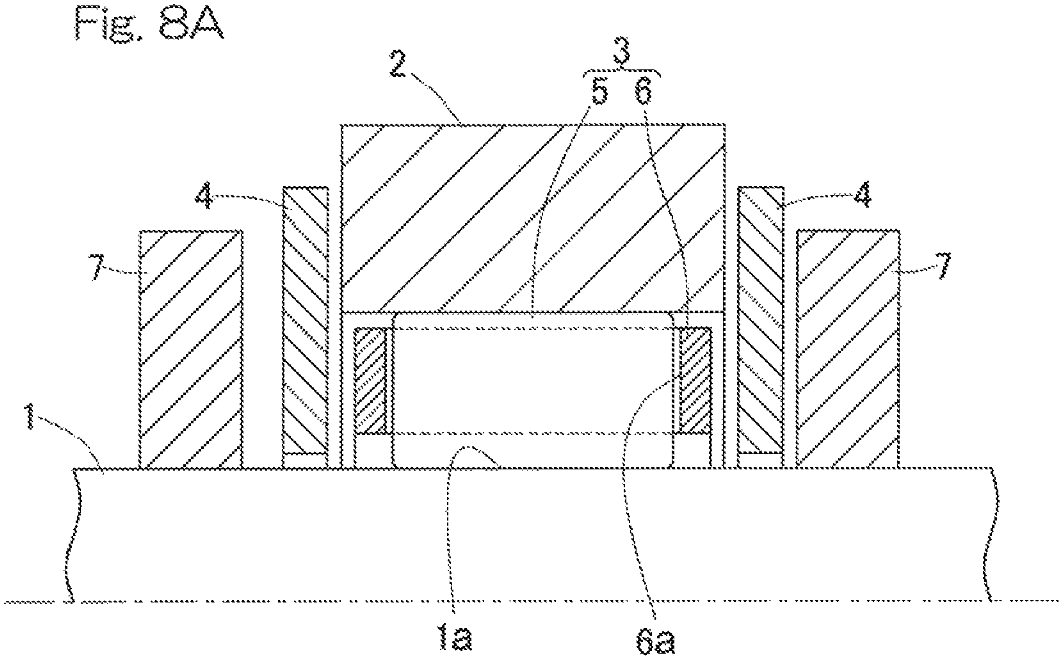
FIG. 8A is a cross-sectional view conceptually showing a state of a conventional bearing structure.
Figure 8B:
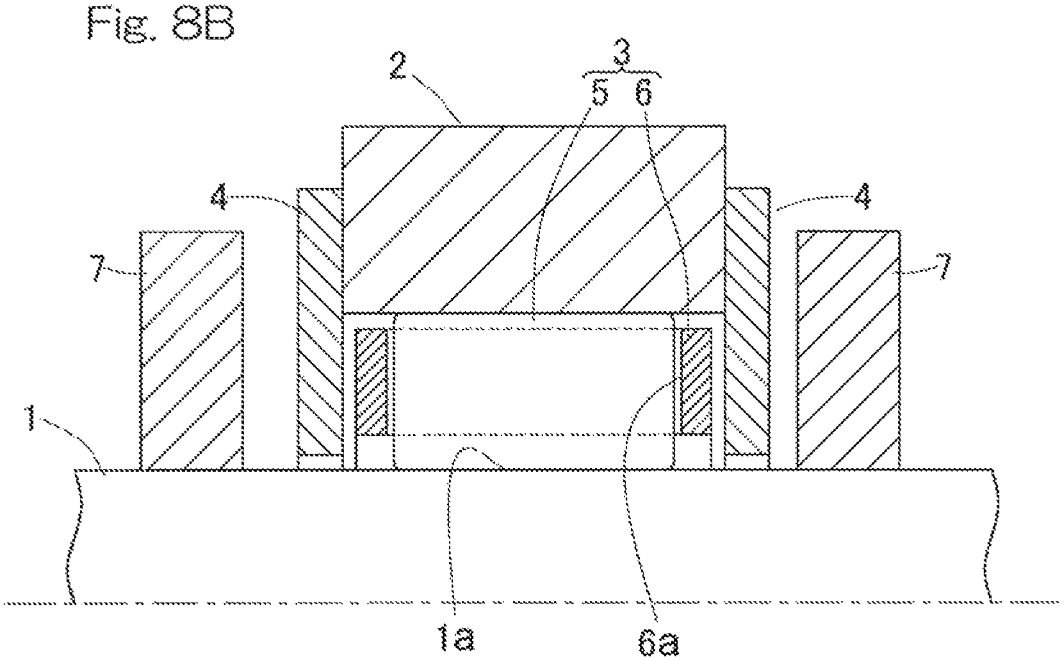
FIG. 8B is a cross-sectional view conceptually showing the conventional bearing structure in a state different from the state shown in FIG. 8A.

FIG. 7 shows a fourth embodiment. In a bearing structure according to the fourth embodiment, as the gap forming device 10, one of thrust washers 4A is arched so that, in the cross-sectional view, an axial distance from the outer-ring-equivalent component 2 is increased toward the outer diameter side thereof. According to this configuration, even if the axial width J of the bearing 3 is smaller than the axial width G of the outer-ring-equivalent component 2, the thrust washer 4A is prevented from coming into close contact with the outer-ring-equivalent component 2. Thus, the gap 11 is constantly formed between the thrust washer 4A and the outer-ring-equivalent component 2.

Although the preferred embodiments have been described with reference to the drawings, those skilled in the art will readily conceive various changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

1 . . . shaft
2 . . . outer-ring-equivalent component
2*a* . . . raceway surface
3 . . . bearing
4, 4A . . . thrust washer
5 . . . rolling element
6 . . . retainer
7 . . . fixed member
10 . . . gap forming device
11 . . . gap
12 . . . projecting portion
13 . . . spacer

What is claimed is:

1. A bearing structure comprising:

a single-row or multiple-row bearing composed of a plurality of rolling elements arranged in a circumferential direction, and an annular retainer that retains the plurality of rolling elements;

an outer-ring-equivalent component disposed on an outer circumference of the bearing, and having an annular raceway surface on which the rolling elements roll; and a thrust washer interposed between the bearing and a fixed member spaced apart from the bearing in an axial direction, the thrust washer being movable in the axial direction, wherein an axial width of the bearing is larger than an axial width of the outer-ring-equivalent component to constantly form a gap between the thrust washer and the outer-ring-equivalent component.

2. The bearing structure as claimed in claim 1, wherein the bearing is a retainer-equipped roller.

3. A bearing structure comprising:

a single-row or multiple-row bearing composed of a plurality of rolling elements arranged in a circumferential direction, and an annular retainer that retains the plurality of rolling elements;

an outer-ring-equivalent component disposed on an outer circumference of the bearing, and having an annular raceway surface on which the rolling elements roll;

a thrust washer interposed between the bearing and a fixed member spaced apart from the bearing in an axial direction, the thrust washer being movable in the axial direction; and a spacer interposed between the bearing and the thrust washer to constantly form a gap between the thrust washer and the outer-ring-equivalent component.

* * * * *